United States Patent
Schweitzer, III et al.

(10) Patent No.: US 11,050,234 B2
(45) Date of Patent: Jun. 29, 2021

(54) INTEGRATION OF PRIMARY PROTECTION RELAYS FOR ELECTRIC POWER DELIVERY SYSTEMS

(71) Applicant: Schweitzer Engineering Laboratories, Inc., Pullman, WA (US)

(72) Inventors: Edmund O. Schweitzer, III, Pullman, WA (US); David E. Whitehead, Pullman, WA (US); Krishnanjan Gubba Ravikumar, Pullman, WA (US); Austin Edward Wade, Moscow, ID (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 16/831,128

(22) Filed: Mar. 26, 2020

(65) Prior Publication Data

US 2021/0057901 A1 Feb. 25, 2021

Related U.S. Application Data

(60) Provisional application No. 62/889,594, filed on Aug. 21, 2019.

(51) Int. Cl.
*H02H 1/00* (2006.01)
*H02H 7/22* (2006.01)
(Continued)

(52) U.S. Cl.
CPC .......... *H02H 1/0061* (2013.01); *H02H 7/22* (2013.01); *H02J 3/00* (2013.01); *H02J 3/18* (2013.01); *G08B 29/06* (2013.01)

(58) Field of Classification Search
CPC .......... G08B 21/00; G08B 23/00; G05D 3/12; G05B 17/02; H02J 3/00; H02J 3/18;
(Continued)

(56) References Cited

U.S. PATENT DOCUMENTS 6,396,279 B1 5/2002 Gruenert
6,608,493 B2 8/2003 Hensler
(Continued)

OTHER PUBLICATIONS

David Costello: Understanding and Analyzing Event Report Information, Oct. 2000.
(Continued)

*Primary Examiner* — Van T Trieu
(74) *Attorney, Agent, or Firm* — Gregory C. Baker; Richard M. Edge

(57) ABSTRACT

Systems and methods for facilitating selected communications among primary protection relays using a supervisory system with a configurable input/output (IO) map. Primary protection relays may obtain signals from equipment associated with an electric power delivery system and provide primary protection without need for communication. The primary protection relays may communicate a unique identifier as well as signal values, states, and commands to the supervisory system. The supervisory system may route specifically identified communications among primary protection relays in accordance with a configurable IO map by transmitting selected portions of the communications on a port associated with the receiving primary protection relay. The primary protection relays may perform secondary protection and other operations using the communicated information.

20 Claims, 7 Drawing Sheets

(51) Int. Cl.
*H02J 3/18* (2006.01)
*H02J 3/00* (2006.01)
*G08B 29/06* (2006.01)

(58) Field of Classification Search
CPC .... H02J 3/32; H02J 3/46; H02J 13/00; H02H 3/08; H02H 3/42; H02H 1/00; H02H 1/0061; H02H 7/00; H02H 7/22
See application file for complete search history.

(56) References Cited

U.S. PATENT DOCUMENTS

| | | |
|---|---|---|
| 6,795,789 B2 | 9/2004 | Vandiver |
| 6,847,297 B2 | 1/2005 | Lavoie |
| 6,892,115 B2 | 5/2005 | Berkcan |
| 6,892,145 B2 | 5/2005 | Topka |
| 6,909,942 B2 | 6/2005 | Andarawis |
| 6,985,784 B2 | 1/2006 | Vandevanter |
| 6,999,291 B2 | 2/2006 | Andarawis |
| 7,012,421 B2 | 3/2006 | Lavoie |
| 7,043,340 B2 | 5/2006 | Papallo |
| 7,058,481 B2 | 6/2006 | Jiang |
| 7,058,482 B2 | 6/2006 | Fletcher |
| 7,068,483 B2 | 6/2006 | Papallo |
| 7,068,612 B2 | 6/2006 | Berkcan |
| 7,111,195 B2 | 9/2006 | Berkcan |
| 7,117,105 B2 | 10/2006 | Premerlani |
| 7,151,329 B2 | 12/2006 | Andarawis |
| 7,254,001 B2 | 8/2007 | Papallo |
| 7,259,565 B2 | 8/2007 | Diercks |
| 7,262,943 B2 | 8/2007 | Stellato |
| 7,301,738 B2 | 11/2007 | Pearlman |
| 7,460,590 B2 | 12/2008 | Lee |
| 7,532,955 B2 | 5/2009 | Dougherty |
| 7,636,616 B2 | 12/2009 | Fletcher |
| 7,693,607 B2 | 4/2010 | Kasztenny |
| 7,747,354 B2 | 6/2010 | Papallo |
| 7,747,356 B2 | 6/2010 | Andarawis |
| 7,986,503 B2 | 7/2011 | Papallo |
| 8,024,494 B2 | 10/2011 | Soed |
| 8,213,144 B2 | 7/2012 | Papallo |
| 8,560,255 B2 | 10/2013 | Elwarry |
| 8,891,963 B2 | 11/2014 | Patel |
| 9,366,711 B2 | 6/2016 | Klapper |
| 9,632,147 B2 | 4/2017 | Hensler |
| 9,819,611 B2 | 11/2017 | Snowdon |
| 10,178,047 B2 | 1/2019 | Chapman |
| 10,379,991 B2 | 8/2019 | Yang |
| 2003/0048508 A1 | 3/2003 | Yu |
| 2005/0267728 A1* | 12/2005 | Maher .................. G06F 13/387 703/25 |
| 2007/0067132 A1 | 3/2007 | Tziouvaras |
| 2009/0012728 A1 | 1/2009 | Spanier |
| 2009/0207034 A1* | 8/2009 | Tinaphong ............ H02H 9/042 340/635 |
| 2009/0296583 A1 | 12/2009 | Dolezilek |
| 2010/0040068 A1 | 2/2010 | Wimmer |
| 2010/0183298 A1 | 7/2010 | Biegert |
| 2014/0104738 A1 | 4/2014 | Schweitzer, III |
| 2016/0013632 A1 | 1/2016 | Lloyd |
| 2017/0026291 A1 | 1/2017 | Smith |
| 2017/0288950 A1 | 10/2017 | Manson |
| 2018/0034689 A1 | 2/2018 | Kanabar |
| 2018/0089057 A1 | 3/2018 | Yang |
| 2018/0323611 A1* | 11/2018 | Gubba Ravikumar ..................... H02J 13/00017 |
| 2018/0348267 A1 | 12/2018 | Yang |
| 2019/0052083 A1* | 2/2019 | Lucas, Jr. ................ H02J 3/18 |
| 2019/0103762 A1 | 4/2019 | Dolezilek |

OTHER PUBLICATIONS

Joe Perez: A Guide to Digital Fault Recording Event Analysis, 2010.
Considerations for Use of Disturbance Recorders; a Report to the System Protection Subcommittee of the Power System Relaying Committee of the IEEE Power Engineering Society, Dec. 27, 2006.
David Costello: Event Analysis Tutorial, Part 1: Problem Statements 2011.
Jane Starck, Antti Hakala-Ranta, Martin Stefanka, Switchgear Optimization Using IEC 61850-9-2 and Non-Conventional Measurements May 23, 2012.
Will Allen, Tony Lee: Flexible High-Speed Load Shedding Using a Crosspoint Switch Oct. 2005.
Qiaoyin Yang, Rhett Smith: Improve Protection Communications Network Reliability Throught Software-Defined Process Bus, Jan. 2018.
Caitlin Martin, Steven Chase, Thanh-Xuan Nguyen, Dereje Jada Hawaz, Jeff Pope, Casper Labuschagne: Bus Protection Considerations for Various Bus Types; Oct. 2013.
David Dolezilek, Colin Gordon, Dwight Anderson: Fast Fault Detection, Isolation, and Recovery in Ethernet Networks for Teleprotection and High-Speed Automation Applications, Mar. 2016.
European Application No. 20191639.2, European Search Report dated Dec. 23, 2020.

* cited by examiner

BREAKER FAILURE TRIP CONFIGURATION

Parameters  Documentation

452

| Main Bus | Source Relay | Source Relay Logic Element | Integrator Virtual Bit | F1 | F2 | F3 | F4 | F5 | T1 | S1 | S2 |
|---|---|---|---|---|---|---|---|---|---|---|---|
| Bkr Failure Trip | F1 | SV20T | VB050 | ■ | X | X | X | X | X | X | X |
| Bkr Failure Trip | F2 | SV20T | VB051 | X | ■ | X | X | X | X | X | X |
| Bkr Failure Trip | F3 | SV20T | VB052 | X | X | ■ | X | X | X | X | X |
| Bkr Failure Trip | F4 | SV20T | VB053 | X | X | X | ■ | X | X | X | X |
| Bkr Failure Trip | F5 | SV20T | VB054 | X | X | X | X | ■ | X | X | X |

Destination Relays

Figure 4B

INTEGRATION OF PRIMARY PROTECTION RELAYS FOR ELECTRIC POWER DELIVERY SYSTEMS

CROSS-REFERENCE TO RELATED APPLICATIONS

This application claims the benefit of the filing date of U.S. Provisional Patent Application Ser. No. 62/889,594, filed Aug. 21, 2019, for "Integration of Primary Protection Relays for Electric Power Delivery Systems," the disclosure of which is hereby incorporated herein in its entirety by this reference.

TECHNICAL FIELD

This disclosure relates to integration of primary protection relays for electric power delivery systems. More particularly, this disclosure relates to systems, devices, and methods for routing communications between primary protection devices using a high speed and/or slow speed communications switch in a supervisory system or device.

BRIEF DESCRIPTION OF THE DRAWINGS

Non-limiting and non-exhaustive embodiments of the disclosure are described, including various embodiments of the disclosure with reference to the figures, in which:

FIG. 4B illustrates a screenshot of an input diagram for configuring an input output (IO) table in accordance with embodiments of the disclosure.

DETAILED DESCRIPTION

Figure 1:
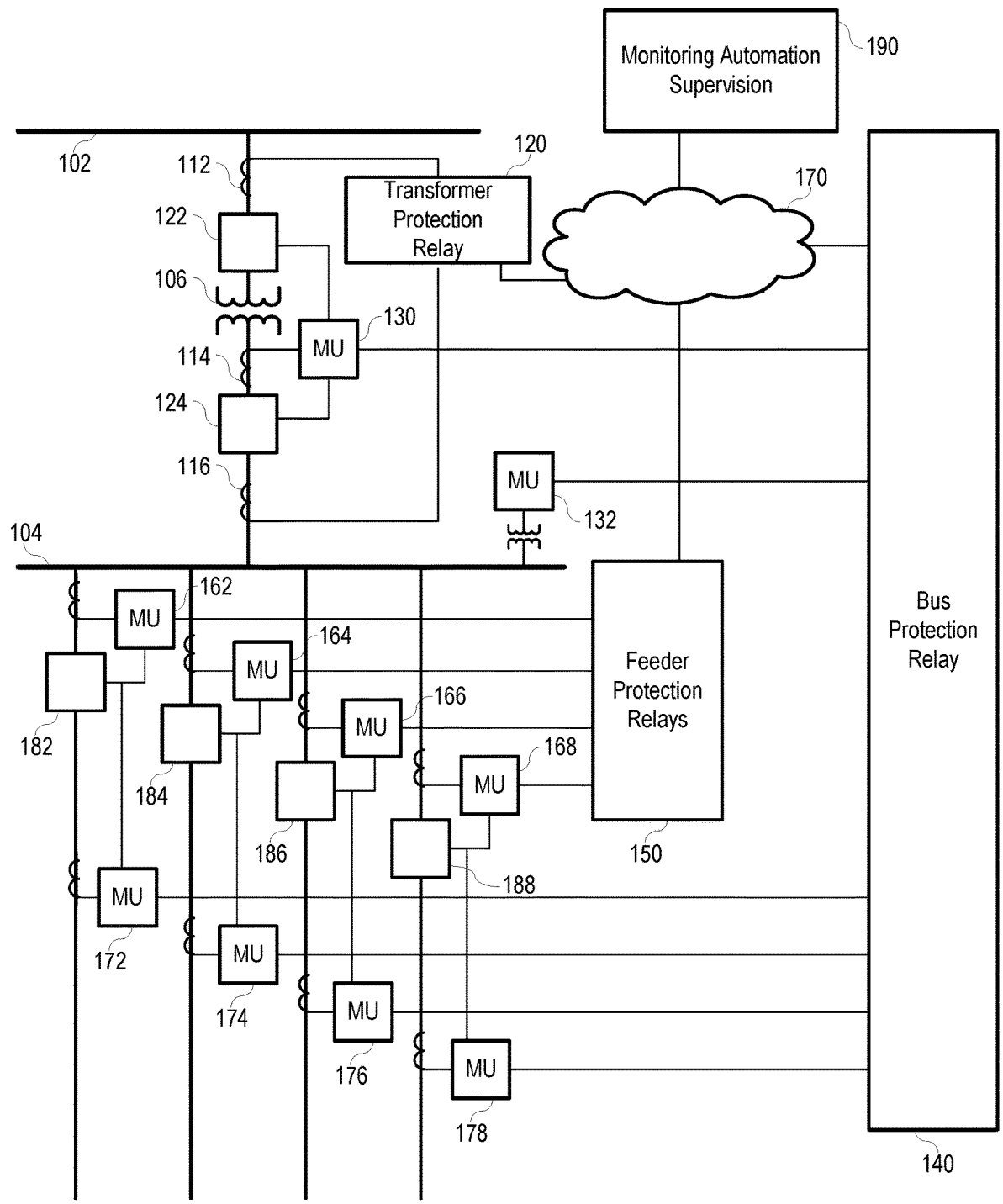
FIG. 1 illustrates a simplified one-line diagram of an electric power delivery system for providing electric power to loads including a system of traditional intelligent electronic devices (IEDs) relays for protection and automation.

Electric power delivery systems are widely used to generate, transmit, and distribute electric power to loads, and serve as an important part of the critical infrastructure. Power systems and components are often monitored and protected by intelligent electronic devices (IEDs) and systems of IEDs that obtain electric power system information from the equipment and provide protective actions, monitor, and automate the power system. Several IEDs may be in communication to facilitate sharing of information for station-wide, area-wide, or even system-wide protection.

It is recognized that modern electric power protection systems are integrated with automation, monitoring, and supervisory systems that may rely on digital communication. IEDs perform numerous protection, automation, monitoring, metering, and communication tasks that require communications between IEDs and among IEDs and other devices. Such tasks generally require highly engineered communications to ensure that the proper signals from the appropriate IEDs are reliably delivered to the consuming IED. Accordingly, IEDs are configured to cooperate with the intended network or other communications system. Such configuration often requires specifically configuring each IED with communications protocols and settings that dictate which signals, actions, calculations, and the like are to be transmitted, the address of the recipient for the messages, the signals, actions, calculations, and the like that are to be received, and so forth. Furthermore, the communications network facilitating communications among the IEDs must be similarly engineered and commissioned. In various systems, IEDs communicate in a peer-to-peer fashion, requiring engineering of the IEDs along with physical configuration and installation of the communication media between each communicating IED.

Thus, systems of IEDs for protection of electric power delivery systems generally require communications systems that are highly engineered, complex, expensive, and require extensive time and expertise to configure, install, commission, and later troubleshoot. Furthermore, such complex communications systems present many points of failure and possible attack, as described briefly below. Embodiments of the present disclosure may include devices and systems to facilitate communications among IEDs that are less complex, easy to configure, secure, and reliable.

Due to the critical nature of electric power systems, attacks have been attempted on electric power systems using the communication system between IEDs. Several kinds of attacks have been observed including, for example: denial of service, man-in-the-middle, phishing, eavesdropping, manipulating controls, injecting commands, vulnerability exploitation, and the like. Attacks have been used to attempt disruption of power systems by disrupting communication between IEDs, taking control of supervisory control and data acquisition (SCADA) systems, manipulating industrial control systems, opening and closing switches and circuit breakers, and the like. As referenced above, complex communications systems among IEDs present possible points of attack. Embodiments of the present disclosure may include devices and systems to facilitate communications among IEDs with fewer possible points of attack, and that continue to provide the critical electric power system protection even during an attack.

Embodiments described herein include systems and devices for integration of primary protection relays. The systems and devices herein may facilitate communication among supervisory systems or devices (e.g., integrators) using the same principles described herein. In such embodiments, primary protection relays may continuously transmit information, requiring little to no configuration for communication. Integrators are used to facilitate communications among primary protection relays using an input/output (IO) map, greatly simplifying the configuration, setting, installation, and commissioning of communications among the primary protection relays as compared to conventional systems.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. In some cases, well-known features, structures or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be implemented as software modules or components. As used herein, a software module or component may include any type of computer instruction or computer executable code located within a memory device and/or transmitted as electronic signals over a system bus or wired or wireless network. In addition, data being tied or rendered together in a database record may be resident in the same memory device, or across several memory devices, and may be linked together in fields of a record in a database across a network. Embodiments may be provided as a computer program product including a non-transitory computer and/or machine-readable medium having stored thereon instructions that may be used to program a computer (or other electronic device) to perform processes described herein.

FIG. 1 illustrates a simplified one-line diagram of an electric power delivery system. It should be noted that the system may include multiple phases and additional equipment and complexity. Also illustrated is a system of IEDs that obtain electric power system information from merging units (MUs), and effect control actions on the electric power system using MUs to provide protection and automation to the electric power delivery system. The power system includes various equipment such as a bus 102 (illustrated as a transmission bus) providing electric power to a second bus 104 (illustrated as a distribution bus) via a transformer 106 for stepping down the power from a high (transmission) voltage to a lower (distribution) voltage. Various feeders extend from the second bus 104 for delivering electric power to distributed loads. Circuit breakers 122, 124, 182, 184, 186, 188 may be used to selectively connect and disconnect portions of the power system for various purposes such as reconfiguration, protection in the event of a fault, or the like.

A bus protection relay 140 may be an IED configured to determine operating conditions on a zone that includes the second bus 104 and provide signals to effect a protection operation upon determination of an adverse condition. IED 140 may obtain current signals related to electric power entering the bus 104 from MU 130, voltages from bus 104 using MU 132, and current signals related to electric power leaving bus 104 on the feeders from MUs 172, 174, 176, and 178. IED 140 may be configured to provide differential protection, overvoltage protection, and various other protection for zone including the bus 104.

Feeder protection relay may be an IED 150 that obtains bus voltage signals from MU 132 and current signals related to the feeders from MUs 162, 164, 166, and 168. IED 150 may provide overcurrent, directional, distance, overfrequency, underfrequency, and other protection to the feeders. Feeder protection relays (IED 150) may communicate with bus protection relay 140 via network 170.

Transformer relay may be an IED 120 configured to provide protection to the transformer 106. IED 120 may obtain current signals from both sides of the transformer 106 from MUs or even directly from current transformers (CTs) 112 and 116. IED 120 may provide information to IED 140 (e.g., via communications network 170). IED 120 may be configured to provide differential protection overcurrent protection, over frequency protection, underfrequency protection, and other various protection for the transformer 106.

MUs may be in communication with various circuit breakers 122, 124, 182, 184, 186, and 188 to provide signals to the circuit breakers and receive status information from the circuit breakers. Upon receiving an "open" signal from an IED, the MUs may be configured to signal related circuit breakers to open. For example, upon detection of an overcurrent condition on the first feeder, IED 150 may be configured to signal MU 162 to open breaker 182 to remove current from the faulted feeder.

In various embodiments, the IEDs may be in communication with a monitoring, automation, or other supervisory system or device 190, such as a SCADA system. Such communications may be facilitated over communications network 170. Communications architecture as illustrated are highly engineered, and present multiple possible points of failure and attack. As mentioned above, a failure in communications or a cyber-attack on the system may affect the bus protection relay 140, feeder protection relay 150, or transformer relay 120 resulting in disruption of the protection of the power system.

Figure 2:
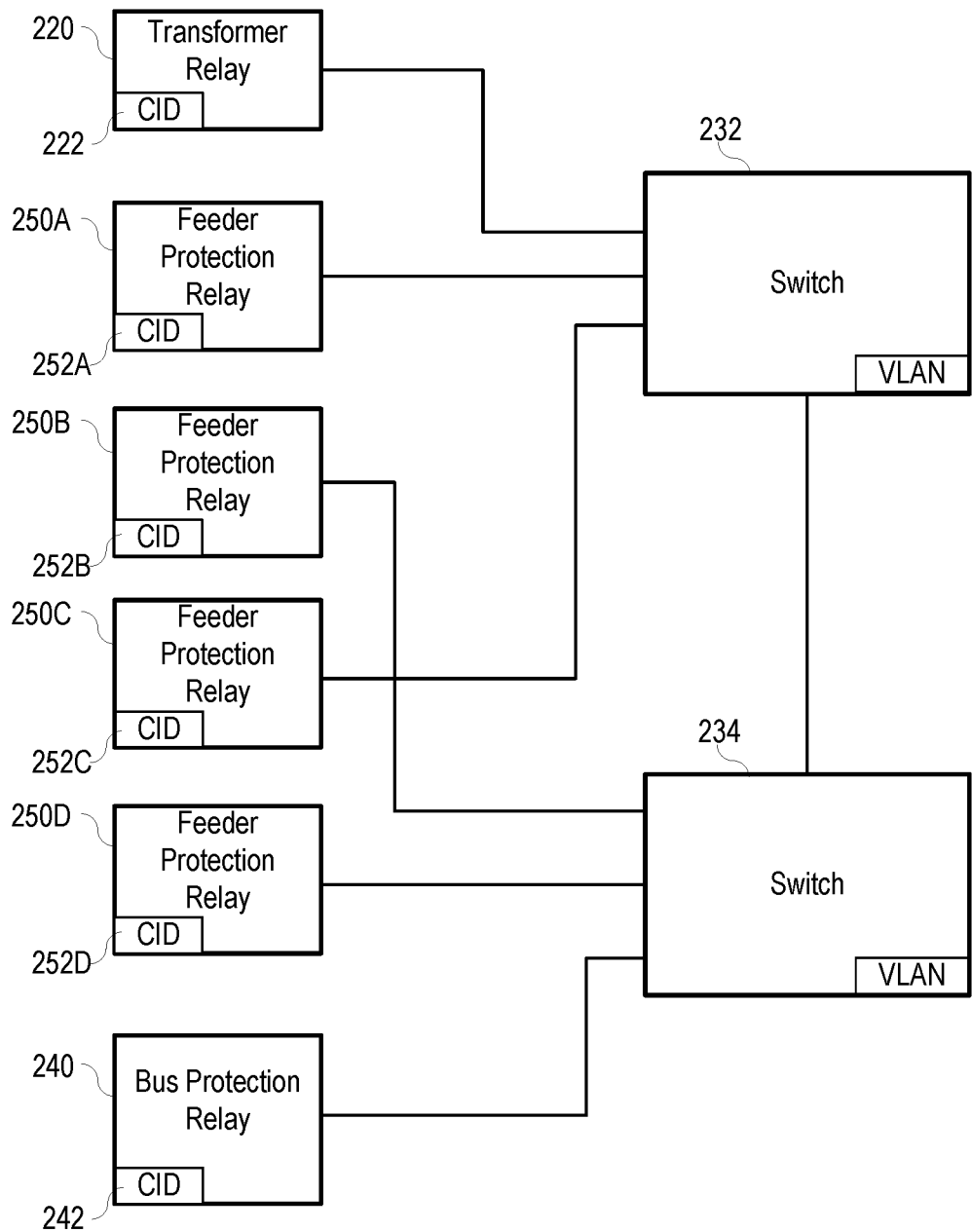
FIG. 2 illustrates a simplified block diagram of a communications system of a plurality of protection relays consistent with the present disclosure.

FIG. 2 illustrates a simplified block diagram of a communication system for communication among a plurality of protection relays consistent with the present disclosure. In particular, a transformer relay 220, feeder protection relays 250A, 250B, 250C, 250D, and bus protection relay 240 are illustrated. The various relays 220, 250A-D, and 240 communicate using communications switches 232, 234. The protection relays obtain signals related to the monitored equipment such as voltages, currents, state (e.g., switch open/closed), position (e.g., step position of a voltage regulator), rotational frequency, temperature, or the like. Such signal may be objected using a monitored equipment interface. The monitored equipment interface may also issue commands to monitored equipment (e.g., close a recloser, open a breaker, step up a voltage transformer, etc.).

The protection relays may be embodied as IEDs that perform functions using the signals to determine a state of the monitored equipment (voltage magnitude, current magnitude, voltage angle, current angle, phasors, symmetrical components, overcurrent, undervoltage, overvoltage, frequency, rate of change of frequency, fault, or the like). Depending on the state and the settings, the IED may issue a control or protection command to the monitored equipment. Many of these conditions (signal value, state, command, and the like) may be used by other IEDs to determine equipment state and commands. For example, the voltage of a bus from the bus protection relay 240 may be used by the feeder protection relays 250A-D to determine a distance to a fault. Similarly, current values from the feeder protection relays 250A-D may be used by a bus protection relay 240 for differential protection. Further, a breaker failure state detected by a feeder protection relay 250A-D after an open signal may be used by the transformer relay 220 to command circuit breaker to open.

In order to facilitate communication of the specific signal values, states, and commands from specific IEDs to specific IEDs, the IEDs themselves and the communications system must be engineered. Systems may be configured in accordance with the IEC-61850 protocol. Each IED may be configured with a communications configuration file (CID) 222, 252A, 252B, 252C, 252D, and 242 containing computer instructions regarding which signal values, states, and commands are to be communicated to which IED; and which signal values, states, and commands of which other IED are to be accepted and processed. Each CID file for each IED may be unique. Communications are sent among IEDs using a communication network such as communication switches 232, 234. The communications switches may be Ethernet switches. In various embodiments, the switches may also be engineered to route traffic appropriately. The communications network may be a software-defined network or can also use VLANs within the Ethernet switches. As the number of IEDs, and numbers of different signal values, states, and commands increases, so does the complexity of the system. Further, to change any communication configuration, multiple IEDs must be reconfigured to the new change. In addition to the inherent complexity, depending on the number of IEDs and signal values, states, and commands to be communicated, the system may undergo periods of communication bombardment, resulting in slow or lost communications.

In accordance with several embodiments herein, primary protection operations are separated (e.g., physically separated or logically separated) from various other functions performed by IEDs and supervisory systems. In such embodiments, communication between primary protection relays and supervisory systems or devices (e.g., one or more integrators) may not be needed for primary protection operations. However, one or more integrators in communication with primary protection relays may facilitate communications among primary protection relays for secondary protection and other operations. The primary protection relays may continuously transmit selected signal values, states, and commands, while the integrator is configured to receive and transmit certain signal values, states, and commands to consuming primary protection relays in accordance with an IO map. Accordingly, primary protection relays do not need extensive communication engineering, setting, installation, or configuration.

Figure 3:
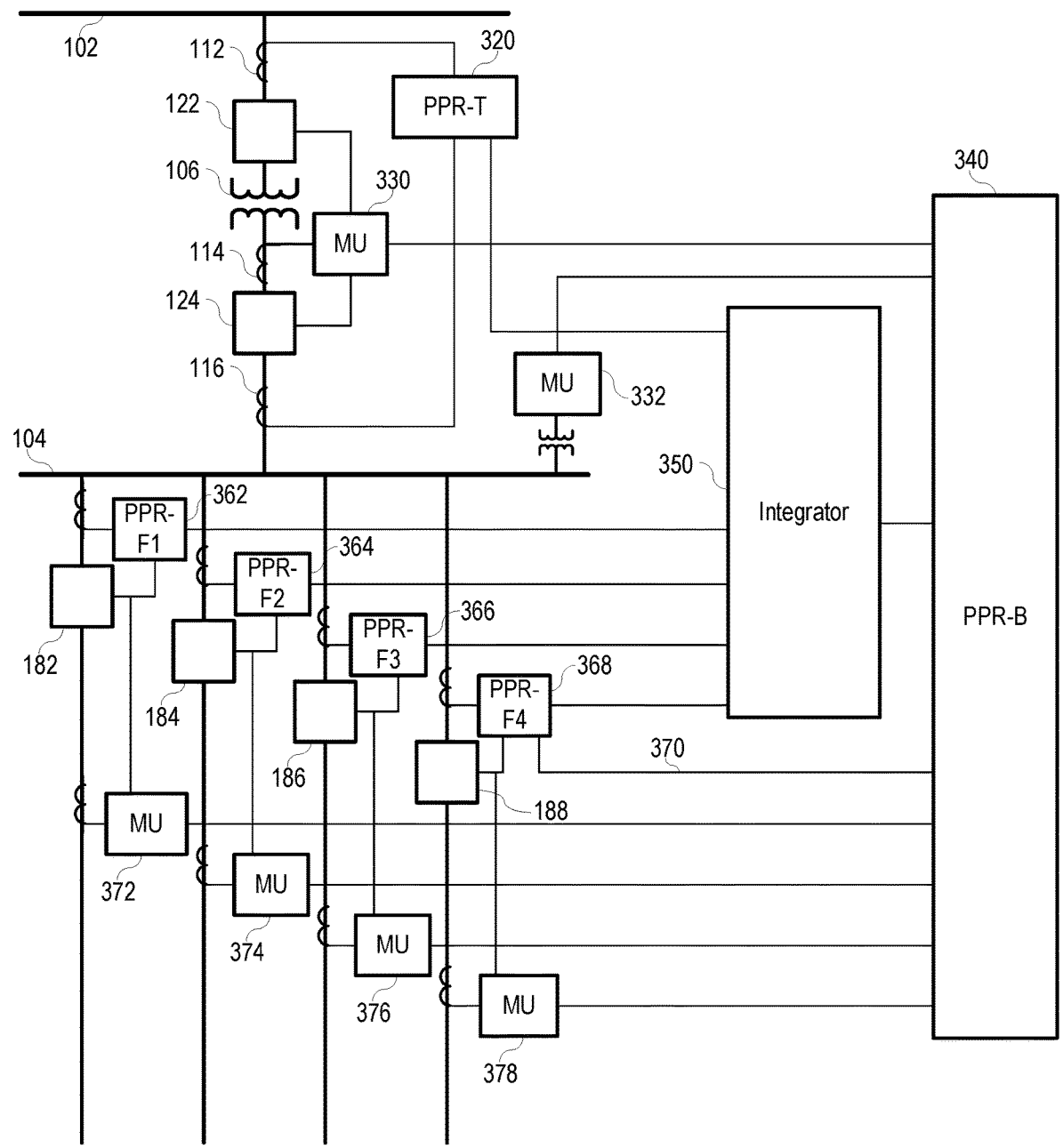
FIG. 3 illustrates a simplified one-line diagram of an electric power delivery system for providing electric power to loads including primary protection relays and integration system in accordance with embodiments of the disclosure.

FIG. 3 illustrates a simplified one-line diagram of an electric power delivery system such as the system illustrated in FIG. 1, including a protection system in accordance with the present disclosure. In particular, the protection system includes various primary protection relays: primary transformer protection relay PPR-T 320, primary bus protection relay PPR-B 340, primary feeder protection relays PPR-F1 362, PPR-F2 364, PPR-F3 366, and PPR-F4 368, that do not depend on communication with an automation, monitoring, or supervisory system to continue providing critical protection to the electric power delivery system equipment. Such primary protection relays may be used to separate primary protection functions from other functions traditionally performed by IEDs. Communications among primary protection relays may be facilitated by integrator 350.

One or more of the primary protection relays may be a transformer relay PPR-T 320 for providing protection to transformer 106. The transformer relay 320 may obtain current signals from CT 112 on the high voltage side of the transformer 106 and CT 116 on the low voltage side of the transformer 106. As illustrated, the transformer relay 320 may obtain current signals directly from CTs 112, 116. In various embodiments, the transformer relay 320 may obtain digitized analog signals from merging units in communication with CTs 112, 116 such as, for example, MU 330. In some embodiments, the transformer relay 320 may also obtain voltage signals from the high voltage and/or low voltage sides of the transformer 106 using potential transformers (PTs) or merging units in communication with PTs.

The transformer relay 320 may determine protective actions using the current and/or voltage signals from high and/or low sides of the transformer 106. For example, the transformer relay 320 may determine overcurrent conditions on the high and/or low sides of the transformer 106; time-overcurrent conditions on the high and/or low sides of the transformer 106; current differential conditions through the transformer 106; neutral overcurrent conditions; restricted earth fault conditions; directional power conditions; and the like. In some embodiments, the transformer relay 320 may obtain temperature inputs from the transformer and determine temperature conditions of the transformer 106. More, different, or fewer protective elements may be performed by the transformer relay 320.

The transformer relay 320 may be in communication with one or more circuit breakers, such as breakers 122 and 124. Such communication may be direct communication with the circuit breakers 122, 124 or via a merging unit such as MU 330. Upon detection of a condition outside of predetermined operating conditions, the transformer relay 320 may send an open or trip command to one or both circuit breakers 122, 124, thus effecting a trip protective action. Accordingly, the transformer relay 320 may provide protective functions to equipment of the electric power system.

Similarly, feeders from bus 104 may be protected using feeder relays PPR-F1 362, PPR-F2 364, PPR-F3 366, and PPR-F4 368. Feeder relays 362-368 may obtain current signals from respective feeders using CTs and/or merging units such as MUs 372, 374, 376, 378. Feeder relays 362-368 may obtain voltage signals from the bus using a PT and/or a merging unit such as MU 332. Using the current and/or voltage signals, the feeder relays 362-368 may determine operating conditions on the respective feeders including, for example: phase overcurrent; ground overcurrent; neutral overcurrent; negative sequence overcurrent; arc flash; overvoltage, undervoltage; directional power; overfrequency; underfrequency; rate-of-change-of-frequency; fault direction; fault distance; and the like. In the event of a condition determined outside of predetermined operating conditions, the feeder relay 362-368 may be configured to send an open or trip command to an associated circuit breaker, thus effecting a protective action on the electric power delivery system.

Feeder relays 362-368 may be in communication with respective circuit breakers 182, 184, 186, 188 as illustrated. In various embodiments, the feeder relays 362-368 may be in direct communication with the circuit breakers 182-188 as illustrated. In various other embodiments, the feeder relays 362-368 may be in communication with the circuit breakers 182-188 via merging units such as MUs 372-378. Accordingly, feeder relays 362-368 may provide protection to the feeders using measurements from the power system, using the measurements in one or more protective elements and effecting a protective action by commanding a circuit breaker to open.

The protection or protective system may include an integrator 350 in communication with various devices and equipment in the electric power delivery system. The integrator 350 may perform monitoring, automation, supervisory, communication, secondary (non-critical, backup, or the like) protection, and other functions. As illustrated, the primary protection relays (e.g., the transformer relay 320 and the feeder relays 362-368) may be in communication with the integrator 350. According to various embodiments, the primary protection relays may transmit sample values, states, and commands to the integrator, which may be used for monitoring, automation, backup, supervisory, and other functions, and for communication to other primary protection relays. The primary protection relays may transmit such communications in accordance with a predetermined communication protocol. In various embodiments, the protocol includes an identification of the primary protection relay that is sending the communication, and a payload of the predetermined set of signal values, states, and commands. The payload may vary depending on the type of primary protection relay (feeder protection relay, transformer protection relay, bus protection relay, or the like). A user may apply settings to the primary protection relay governing which signal values, states, and commands are transmitted. Primary protection relays may transmit such communications in accordance with a predetermined schedule. Primary protection relays may continuously send such communications regardless of a change in state or command.

As mentioned above, each primary protection relay may perform critical protection functions for the equipment monitored thereby with or without communications with the integrator, other primary protection relays, or IEDs. For example, the transformer relay PPR-T 320 may perform overcurrent protection, overvoltage protection, undervoltage protection, and differential protection for the transformer 106 using signals obtained from the equipment regardless of communication with the integrator 350 or other devices. Further automation, control, and protection functions may be performed using signals from other primary protection relays or supervisory systems received by transformer relay 320 via the integrator 350. For example, in the case of a breaker failure subsystem on one of the feeders, the responsible primary protection relay of the feeder may provide a breaker failure subsystem signal to the integrator 350. The integrator 350 may be configured to send breaker failure subsystem signals to the bus relay PPR-B 340. Upon receipt of the breaker failure subsystem signal, the bus protection relay 340 may signal MU 330 to open breaker 124 and/or breaker 122, to remove power from the faulted feeder.

The protection system may also include a primary protection relay in the form of a bus protection relay 340 configured to provide protective functions to the bus 104. Bus protection relay 340 may be a primary protection relay, as it is capable of obtaining power system measurements and providing protective functions without communication with any monitoring or other supervisory system. Bus protection relay 340 may obtain electric power system measurements related to electric power entering and leaving the protected bus 104 using CTs, PTs and the like and/or merging units. As illustrated, bus protection relay 340 obtains current measurement entering bus 104 from merging unit 330 which obtains current signals using CT 114. Voltage measurements may be obtained from merging unit 332 which obtains voltage signals from the bus 104 using a PT. Measurements of current leaving the bus 104 may be obtained from merging units 372, 374, 376, 378, which obtain current signals from the feeders using CTs. The bus protection relay 340 may use the currents and/or voltages to perform various protection functions such as, for example: overcurrent (phase, ground, neutral); breaker failure subsystem; time-overcurrent; current differential; undervoltage; overvoltage; and the like. The bus protection relay 340 may be configured to protect a zone of the electric power delivery system such as, for example, between circuit breaker 114 and breakers 182-188. The bus protection relay 340 may be configured to detect an event using the currents and/or voltages, and send a trip command to one or more circuit breakers to remove power from a portion of the power system affected by the event. For example, the bus protection relay 340 may determine that a fault is present on bus 104 using current differential protection principles, and command breaker 124 to open (either via direct communication or via merging unit 330) to remove electric power from the faulted bus 104. The bus protection relay 340 may command breakers 182-188 to open (either via direct communication or via merging units 372-378) to limit potential backfeed from the feeders into the faulted bus 104.

Similar to the primary protection relays 320 and 362-368, the bus relay may continue providing protective functions to the power system regardless of availability of any integrator, monitoring, automation, or supervisory systems or devices. In various embodiments described herein, the primary protection relays 320, 340, 362-368 may be configured to primarily perform protective functions, with secondary functions being removed to a separate device such as the integrator 350. Integrator 350 may be described as a supervisory device because it supervises and cooperates operation of other devices, such as relays 320, 340, and 362 through 368. For example, calculating, time stamping, and time aligning synchrophasors may be unnecessary for protective functions, and thus removed to the integrator. Similarly, many communications functions, such as formatting communications to correspond with supervisory protocols, may be removed to the integrator.

Some primary protection functions may be performed by a combination of primary protection relays. For this, the system may include some communication between primary protection relays. As illustrated, a dedicated communication pathway 370 is configured between feeder relay 368 and bus relay 340. Although a single communication pathway between one feeder relay and the bus relay is illustrated, several primary protection relays may be in similar communication. In some embodiments, the communication may be peer-to-peer, high speed, and operate on optical or electrical media. The communication may operate in accordance with the MirroredBits® protocol available from Schweitzer Engineering Laboratories, Inc. of Pullman, Wash. In some embodiments, the communication may facilitate primary protection functions such as, for example, transfer trip, blocking, interlocking, permissive schemes, direct control, relay-to-relay communications, or the like. In the illustrated example, the communication 370 may be used for direct transfer tripping by the bus relay 340 in the event of breaker failure subsystem detection by the feeder relay 368. Thus, the bus relay may clear a fault by opening breaker 124 and/or 122 in the event that breaker 188 does not trip.

The integrator 350 may be configured to communicate monitoring, automation, and/or supervisory information to the primary protection relays, and to facilitate communications among the primary protection relays. For example, the integrator 350 may be configured to perform breaker failure subsystem analysis to determine if a breaker has operated after a signal has been sent to open the breaker. If the integrator 350 determines that the breaker has not opened, it may send a signal to the merging unit and/or to the appropriate primary protection relay to attempt to open the breaker. The integrator 350 may also signal a second breaker to open, where the second breaker is positioned to also remove power from the effected portion of the electric power delivery system. For example, upon failure of breaker 182, the integrator 350 may signal for breaker 122 or 124 to open, removing power from the bus 104 and related feeders.

The integrator 350 may be configured to send specified communications from certain primary protection relays to appropriate receiving primary protection relays. For example, bus 104 voltage measurements from the primary bus protection relay PPR-B 340 may be used for certain protection operations of the feeder protection relays 362-368. Accordingly, the integrator 350 may be configured to send bus voltage measurements from PPR-B 340 to each of the feeder protection relays 362-368 by routing such voltage measurements to the communications ports associated with each of the feeder protection relays 362-368.

Communications between the primary protection relays and the integrator may be bi-directional. In various embodiments, the integrator 350 may include multiple communications ports, each associated with a different primary protection relay. Each communications channel may be synchronous or asynchronous. Each communications channel may be deterministic such that communications among primary protection devices is deterministic. With different communication ports in communication with different primary protection relays, the integrator 350 may be easily configured to route specific communications among different primary protection relays by simply routing the communications between different communication ports.

Figure 4A:
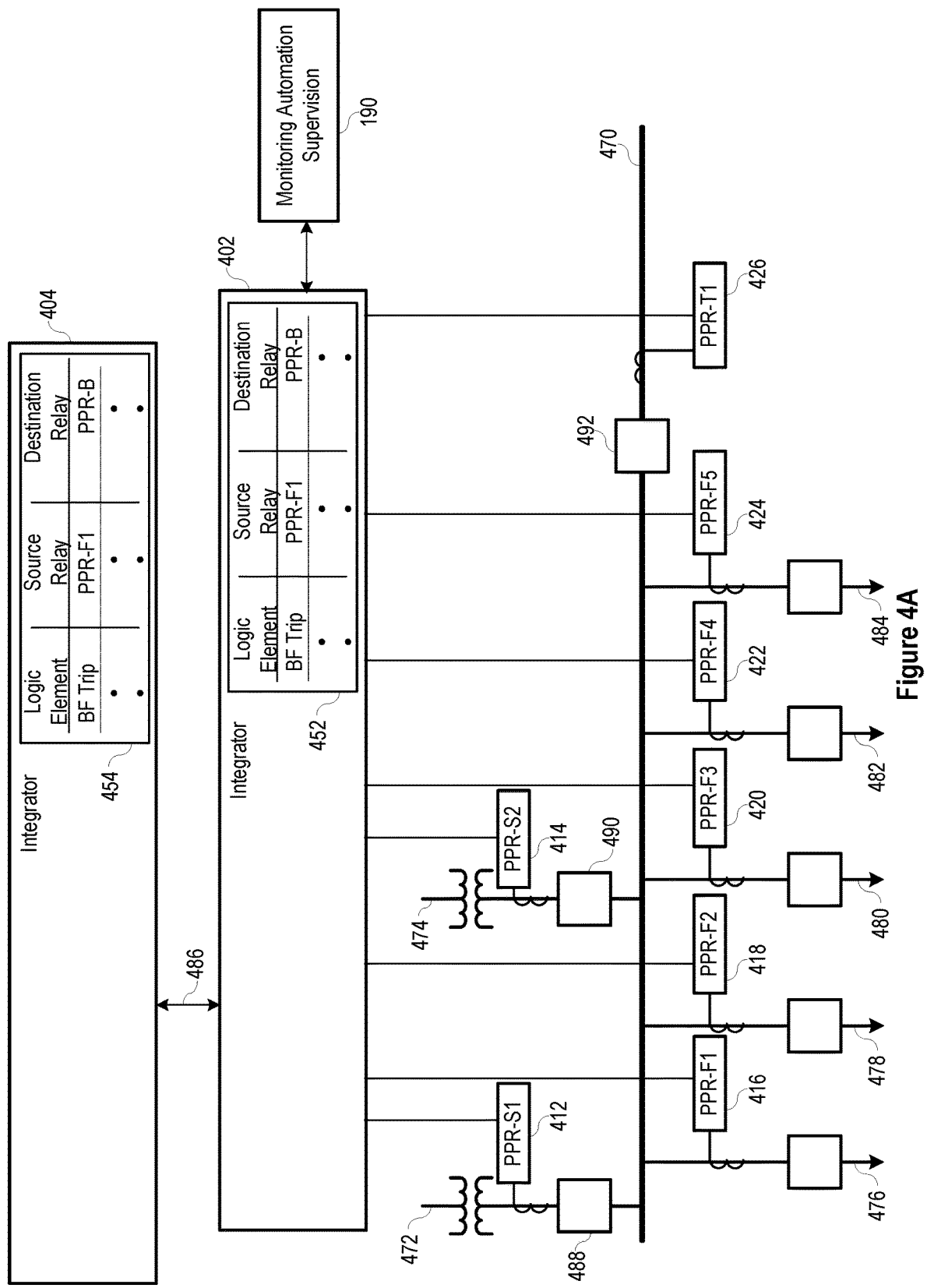
FIG. 4A illustrates a simplified block diagram of an integration system for primary protection relays in accordance with embodiments of the disclosure.

FIG. 4A illustrates a simplified block diagram of an integration system for primary protection relays providing protection functions in an electric power delivery system in accordance with several embodiments herein. The illustrated electric power delivery system includes two power sources, providing electric power to main bus 470 via transformers, and monitored by relays PPR-S1 412 and PPR-S2 414. Breakers 488 and 490 selectively connect and disconnect sources 472, 474 from the main bus 470. Main bus 492 includes a tie breaker 492 and PPR-T1 426 for protection functions and controlling the tie breaker 492. Various feeders 476, 478, 480, 482, 484 distribute electric power from the main bus 470 to downstream equipment. Each feeder 476-484 includes a breaker for selective disconnection. Feeder relays PPR-F1 416, PPR-F2 418, PPR-F3 420, PPR-F4 422 and PPR-F5 424 provide protective functions for the various feeders. The various primary protection relays are illustrated for purposes of demonstration only, and more or fewer, and different configurations of primary protection relays are envisioned. The primary protection relays may be in communication with a number of integrators (e.g., two integrators 402, 404, where connections to integrator 402 are illustrated, while connections to integrator 404 are not separately illustrated for simplicity). While two separate integrators 402, 404 are illustrated more or fewer integrators may be used. As illustrated, the system includes two integrators 402, 404 for redundancy. In various other embodiments, multiple integrators may be used to facilitate communication between multiple PPRs.

As mentioned above, each primary protection relay may be in communication with each integrator 402, 404 using separate communication ports. The integrators 402, 404 are each configured to route specific communications among the primary protection relays. In accordance with one embodiment, the communications routing in each integrator may be set using a respective IO map 452, 454 (e.g., an IO map subsystem). The IO map may be presented as a visual representation of communication routes among connected primary protection relays. In one embodiment, the IO map may be a table. The IO map may be configured using a spreadsheet, webpage, setting software, or the like. The IO map may be configured using a human machine interface (HMI) or other interface. The IO map may include identification of a particular signal or logic element (signal value, state, command, or the like), identification of the primary protection relay sending the signal (source relay), and identification of the primary protection relay to which the signal should be transmitted (destination relay). In various embodiments, the primary protection relays are identified by a specific identifier associated with the primary protection relay and transmitted to the integrator by the primary protection relay. In various embodiments, the identifier may be transmitted with each communication from the primary protection relay. In various other embodiments, the identifier is only transmitted upon connection of the primary protection relay to the integrator, whereupon the integrator assigns the identified primary protection relay with the communications port to which it is connected. In any case, the integrator may track which primary protection relay is in communication with which communications port for proper routing of communications. In various other embodiments, the IO map may include an identification of the ports instead of identification of the primary protection relays. In such embodiments, the integrator may route specified communications among communication ports as identified in the IO map regardless of the devices connected to the communication ports.

Integrators 402 and 404 are illustrated as being configured with IO maps 452, 454 in the form of tables. Each IO map includes a column indicating the specified signal to be routed (logic element), along with a corresponding transmitting device ("source relay") and receiving device ("destination relay"). For example, upon receipt of the specified logic element from the source relay, the integrator will route the logic element to the indicated destination relay. The routing may be performed by forwarding the communication from the port associated with the sending device to the port associated with the receiving device. In some embodiments, the signal may be associated with the originating port (e.g., the port from which the specific signal is received) and the transmitting port (e.g., the port to which the specific signal should be transmitted) instead of indicating the originating and recipient devices.

FIG. 4B illustrates a screen shot of an interface for setting an IO map such as IO map 452 or 454. The IO maps may be stored by the integrators 402, 404. In one embodiment, the integrators may include a communications switch that includes executable instructions for performing communications routing in accordance with the IO map. In various embodiments, the executable instructions may form a crosspoint switch to effect communications in accordance with the IO map.

As illustrated in FIG. 4B, the IO maps 452, 454 have indicated that a breaker failure subsystem trip signal (BF Trip logic element SV20T) from the first feeder primary protection relay (PPR-F1) should be routed to each of the other primary protection relays by including an "X" indication. It can be seen that breaker failure subsystem signals from PPR-F5 should not be communicated to the other feeder relays PPR-F1, PPR-F2, PPR-F3, and PPR-F4 (using the "0" indication) but should be sent to the tie-breaker relay PPR-T1 and the source protection relays PPR-S1 and PPR-S2. This may be due to a unique feature of the feeder protected by PPR-F5 such as the feeder having no connected equipment capable of backfeed. Accordingly, upon receipt of the BF Trip signal from PPR-F1, the integrator 402, 404 will transmit the BF Trip signal to PPR-F2, PPR-F3, PPR-F4, PPR-F5, PPR-T1, PPR-S1, and PPR-S2. The receiving relays may then be configured to signal one or more breakers to open in order to remove power from the main bus and disconnect the feeders from the main bus to avoid backfeed into the faulted feeder. In some embodiments, the integrator may keep a record of which primary protection relay is in communication with each communication port such that the signals may be appropriately routed to the primary protection relay associated with the communication ports. As illustrated, the IO map 452 of integrator 402 is identical with the IO map 454 of integrator 404. In various embodiments, especially when the system is not configured with redundant integrators, the IO maps of different integrators may be different, in order to route communications among primary protection relays in accordance with the planned protection scheme.

In accordance with the illustrated embodiments, the integration system for the various primary protection relays may provide communications among the primary protection relays for additional protection functions. The primary protection relays may provide primary protection operations to protected equipment of the electric power delivery system even without communications from the integrator. Communications with the integration system may be effected even without setting the primary protection relays with communications settings.

Referring to FIG. 4A, integrator 402 may be in communication with a monitoring, automation, or supervisory system 190, such as, for example, SCADA. While single integrator 402 may be in communication with the system 190, either or both of the integrators 402, 404 may be in communication with the system 190.

Integrators 402, 404 may be in communication with each other over link 486. The communication link may be used to communicate signals from one PPR, to a first integrator 402, which communicates the signal to a second integrator 404 in accordance with an IO map 452. The second integrator 404 may then communicate the signal to an intended recipient PPR in accordance with IO map 454, which may be used if the sending and receiving PPRs are connected to different integrators. Communication link 486 may be used to communicate between the integrators 402, 404. For example, the integrators 402 and 404 may be configured in a primary/backup configuration and share quality bits such that the integrators 402 and 404 may decide which integrator is the primary and which is the backup in accordance with the quality bit values.

Figure 5:
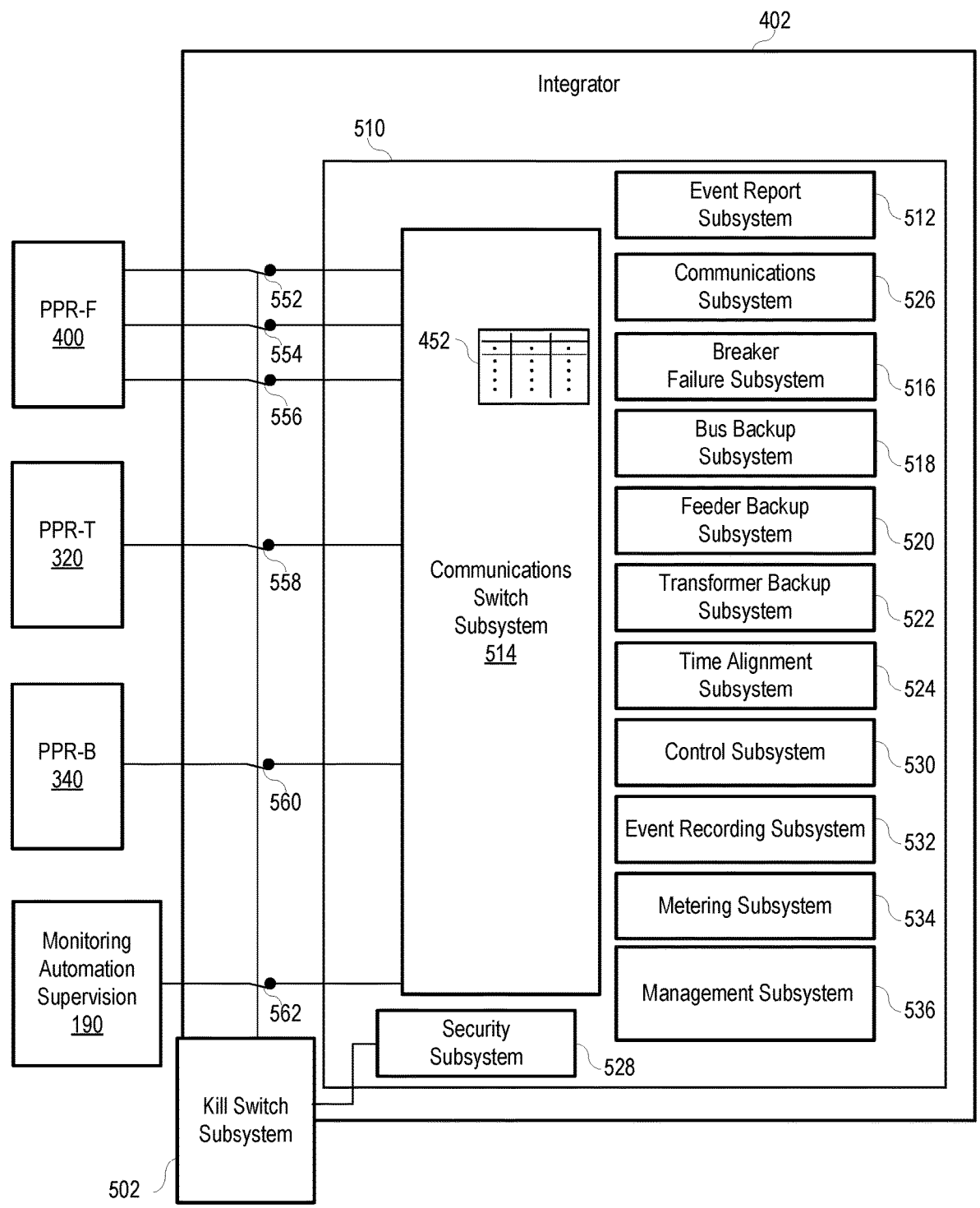
FIG. 5 illustrates a simplified block diagram of an integrator for communication among primary protection relays in accordance with embodiments of the disclosure.

FIG. 5 illustrates a simplified block diagram of an integrator (e.g., integrator 350, 402, 404) in accordance with several embodiments of this disclosure. For example, the integrator 402 facilitates the physical separation of primary protection functions (performed by the primary protection relays) from non-protective functions (performed by the integrator), and facilitates communication among primary protection relays for extended protective and other functions. Several functions of the integrator include routing of communications among primary protection relays, provision of non-primary protective functions such as automation and backup protection for the power system, integration with other integrators, as well as communication with monitoring, automation, and supervisory systems. Certain functions previously (e.g., conventionally) performed by IEDs protecting electric power systems that are not directly required for primary protection may be removed from the primary protection devices in accordance with the present disclosure and performed by an integrator. Each integrator may be in communication with one or more primary protection devices, one or more other integrators, as well as other monitoring, automation, and supervisory systems.

As discussed above, the primary protection devices are configured to continue to provide protective functions to the electric power delivery system even when the integrator or other monitoring, automation, and/or supervisory systems and devices are unavailable. Thus, protection of the electric power delivery system continues through times of disruption or unavailability of the integrator (e.g., during testing procedures, restart, upgrade, settings changes, hardware malfunction, software error, bit flip errors, physical attack, cyber-attack, or the like). The integrator may be configured to stop its communication with primary protection devices in the event of a disruption or period of unavailability of the integrator so that such integrator disruption or unavailability cannot affect the protective functions of the primary protection devices.

As illustrated in FIG. 5, the integrator 402 includes a processing device or subsystem 510 for executing instructions related to such functions. The processor subsystem 510 may be any processor capable of executing computer instructions including, for example, a computer processor, a microprocessor, an FPGA, or the like, and may be packaged with or be in communication with computer memory for storing computer instructions, such as, for example non-transitory computer readable memory to store instructions and other information. Such instructions may be executed by the processor subsystem 510 to enable a variety of functions. The processor subsystem 510 may be embodied as one or more processing devices, with different modules, or groups of modules, processed by different processors.

In the illustrated embodiment, the integrator 402 may include a variety of subsystems to perform various functions, including an event report subsystem 512, communications switch subsystem 514, breaker failure subsystem 516, bus backup protection subsystem 518, feeder backup protection subsystem 520, transformer backup protection subsystem 522, time alignment subsystem 524, communications subsystem 526, security subsystem 528, and the like. Additional functions that may be performed by the integrator 402 include automation and control such as in control subsystem 530. The integrator 402 may include event recording subsystem 532 functions where power system conditions, time, and actions taken are recorded for later retrieval, and/or transmission using the event report function 512. The integrator 402 may perform metering operations with meter subsystem 534. With management subsystem 536, the integrator may also perform settings and/or firmware management operations, such as, for example, maintaining current records of settings and firmware versions for each of the connected primary relays; updating settings on primary relays; updating firmware of primary relays; and the like.

The integrator 402 may be in communication with, and even facilitate communication among several of the primary protection devices, as discussed herein including, for example: one or more feeder protection relays PPR-F 400 (e.g., such as feeder protection relays 362, 364, 366, 368); transformer protection relay PPR-T 320; bus protection relay PPR-B 340; motor relay, generator relay; and the like. The integrator 402 may be in communication with other integrator(s), monitoring, automation, or supervisory systems 190. As suggested above, the integrator 402 may perform communication functions and may function as a communication switch among the various connected devices.

As mentioned above, the integrator 402 may include a communications switch subsystem 514. The communications switch subsystem 514 as illustrated is implemented in the processor subsystem 510. In various other embodiments, the communications switch subsystem 514 may be a separate device operating in the integrator 402. The communications switch subsystem 514 may be configured as described herein to facilitate communications among the various primary protection relays using an IO map 452.

The integrator 402 may include one or more disconnect switches 552, 554, 556, 558, 560, 562 for selectively making and breaking communication paths with the various connected devices. Any configuration of switches capable of selectively breaking the communication pathways to the various device may be used. In some embodiments, the switches 552-562 may be electromagnetic relays capable of rapid disconnection. In some embodiments, the switches 552-562 may be optical switches when communication with the devices uses optical media. In any case, the switches 552-562 may be configured to disconnect communication between the various devices and the integrator 402, operated by a kill switch subsystem 502.

In various embodiments, an integrator may be useful for providing signals among a PPR and an IED in accordance with a protocol expected by the IED. The communications subsystem 526 of the integrator 402 may include instructions for configuring particular signals from one or more particular PPRs into a format as expected by an IED. The particular signals from the particular PPR may be governed by an IO map 452. For example, a protection system may be configured with both PPRs and IEDs for providing protection, automation, and/or control to an electric power delivery system. One particular IED may be configured to communicate using the IEC 61850 protocol, accepting and providing communications over a switched Ethernet communications network. The IED may require certain signals from particular PPRs for determined functions. An IO map 452 of the integrator 402 may be configured such that upon receipt of the certain signal from the particular PPR, the signal will be mapped into a communication in accordance with the IEC 61850 protocol using the instructions of the communications subsystem 526, and transmitted to the receiving IED over a communications network via one or more communication ports.

In various embodiments, the IO maps of multiple integrators may be configured such that signals from particular PPRs may be transmitted to receiving PPRs via multiple integrators. That is, an IO map in a first integrator may be configured such that a particular signal from a certain PPR is transmitted to a second integrator. In turn, the IO map of the second integrator is configured to transmit the particular signal to an intended receiving PPR. Accordingly, IO maps in connected integrators may be used to facilitate communication of predetermined signals among particular PPRs.

Figure 6:
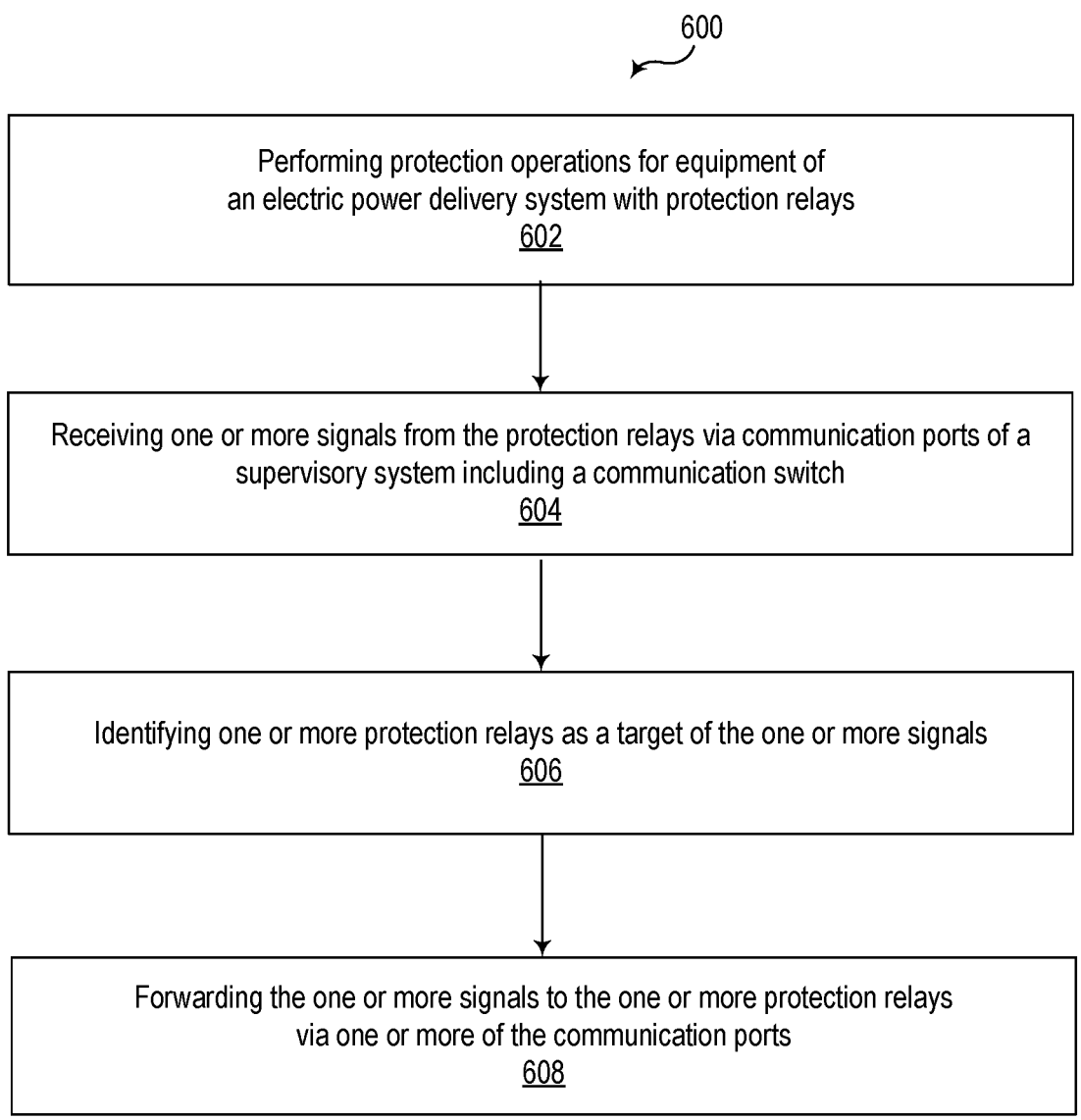
FIG. 6 illustrates a flow chart of a method of managing communications between protection relays of an electric power delivery system in accordance with embodiments of the present disclosure.

FIG. 6 illustrates a flow chart of a method 600 of managing communications between protection relays of an electric power delivery system. At 602, protection operations for equipment of the electric power delivery system are performed with the protection relays. In some embodiments, the system, protection devices or relays, and/or supervisory systems or integrators may be embodied as those discussed above, for example, as discussed in reference to FIG. 1 through FIG. 5.

At 604, one or more signals from the protection relays are received via communication ports of a supervisory system including a communication switch in communication with the protection relays.

At 606, at least one of the protection relays is identified as a target of the one or more signals. For example, at least one unique identifier associated with each of the protection relays may be used to determine the target protection relay. By way of further example, an input/output (IO) map of the supervisory system may be used to determine (e.g., associate) the target protection relay.

At 608, the one or more signals are forwarded to the at least one of the protection relays via one or more of the communication ports.

As indicated above, electric power delivery systems have become targets for criminals attempting to interrupt electric power delivery or even disable primary equipment. Attacks are due, at least in part, to the complexity in IEDs and related monitoring, automation, communication, and supervisory systems. Furthermore, communications among traditional IEDs and related monitoring, automation, and supervisory systems have grown in complexity and decreased in reliability. Accordingly, provided herein, in accordance with some embodiments, are systems and methods for continued primary protection of electric power delivery systems even without communication among primary protection devices. Additional protection, automation, control and supervision may be implemented using integrators. To facilitate communication among primary protection devices, integrators may include a communications switch. The communications may be configured using an IO table. Accordingly, primary protection relays in accordance to some embodiments may not need the extra settings, code, or other operational expense related with engineered communications.

While specific embodiments and applications of the disclosure have been illustrated and described, it is to be understood that the disclosure is not limited to the precise configurations and components disclosed herein. Accordingly, many changes may be made to the details of the above-described embodiments without departing from the underlying principles of this disclosure. The scope of the present invention should, therefore, be determined only by the following claims.

What is claimed is:

1. A system to integrate communications among primary protection relays in an electric power delivery system, comprising:
    a first primary protection relay and a second primary protection relay of the primary protection relays to provide primary protection to the electric power delivery system, each of the first primary protection relay and the second primary protection relay comprising:
        a monitored equipment interface to receive an electric power delivery system signal value and to transmit a protective action to a piece of monitored equipment;
        a protection subsystem to receive the electric power delivery system signal value from the monitored equipment interface and to implement the protective action when the value is outside of a predetermined operating parameter; and
        a communication subsystem to communicate the electric power delivery system signal value and the protective action;
    a supervisory system in communication with each of the protection relays, comprising:
        a communication switch subsystem comprising a first communication port in communication with the first primary protection relay and a second communication port in communication with the second primary protection relay; and an input/output (IO) map to route one of the electric power delivery system signal value or the protective action from the first primary protection relay to the second primary protection relay through the communication switch subsystem, the second primary protection relay to implement the protective action in response to receipt of the one of the electric power delivery system signal value or the protective action from the first primary protection relay, the input/output (IO) map to selectively and automatically route the one of the electric power delivery system signal value or the protective action from the first primary protection relay to one or more additional protection relays of the primary protection relays.

2. The system of claim 1, wherein the electric power delivery system signal value comprises a state of the piece of monitored equipment and the protection subsystem is to implement the protective action when the state is outside of a predetermined operating parameter.

3. The system of claim 1, wherein the communications switch subsystem is further to selectively transmit and receive communications from each of the first primary protection relay and the second primary protection relay.

4. The system of claim 1, wherein the IO map comprises a plurality of associations between the first primary protection relay and the second primary protection relay.

5. The system of claim 1, wherein the IO map comprises a plurality of associations of input communications and a plurality of targets of the input communications, the plurality of targets comprising a plurality of primary protection relays in the electric power delivery system.

6. The system of claim 1, wherein the first protection relay and the second primary protection relay each comprise at least one of a transformer relay, a bus relay, a feeder relay, a line relay, a motor relay, or a generator relay.

7. The system of claim 1, wherein the IO map is configurable to define a communication pathway between the first primary protection relay and the second primary protection relay.

8. The system of claim 7, wherein the IO map comprises an identification of an input communication, an identification of the first primary protection relay associated with the input communication, and an identification of the second primary protection relay to which the input communication is to be transmitted.

9. The system of claim 1, wherein the first primary protection relay is to generate a first unique identifier and the second primary protection relay is to generate a second unique identifier, and wherein the supervisory system is to associate the first unique identifier with the first primary protection relay and associate the second unique identifier with the second primary protection relay.

10. The system of claim 9, wherein the IO map comprises associations between an input communication, the unique identifier of the first primary protection relay, and the unique identifier of second primary protection relay.

11. A supervisory system to facilitate selected communication among a first primary protection relay and a second primary protection relay in an electric power delivery system, comprising:
a communication subsystem in communication with the first primary protection relay and the second primary protection relay, each of the first primary protection relay and the second primary protection relay to perform primary protection operations for monitored equipment in the electric power delivery system and to receive one or more signals from the primary protection relays including:
at least one unique identifier of each of the first primary protection relay and the second primary protection relay; and
at least one electric power delivery system signal value of monitored equipment in the electric power delivery system;
a communications switch subsystem to transmit the at least one electric power delivery system signal value from the first primary protection relay to the second primary protection relay based on a preselected input/output (IO) map to route the at least one electric power delivery system signal value from the first primary protection relay to the second primary protection relay, the second primary protection relay implement a action in response to the at least one electric power delivery system signal value from the first primary protection relay.

12. The system of claim 11, wherein the IO map comprises a plurality of associations of input communications and a plurality of targets of the input communications, the plurality of targets comprising a plurality of primary protection relays in the electric power delivery system.

13. The system of claim 12, wherein the first primary protection relay is to generate a first unique identifier and the second primary protection relay is generate a second unique identifier, and wherein the supervisory system is to associate the first unique identifier with the first primary protection relay and associate the second unique identifier with the second primary protection relay.

14. A method of managing communications between protection relays of an electric power delivery system, the method comprising:
receiving, using a monitored equipment interface of a first primary protection relay, an electric power delivery system signal value;
implementing, using a protection subsystem of the first primary protection relay, a protective action when the value is outside of a predetermined operating parameter;
transmitting, using a communication subsystem of the first primary protection relay, the electric power delivery system signal value or the protective action to a supervisory system, using a communication subsystem of the supervisory system;
receiving, using a communication switch subsystem of a supervisory system, the electric power delivery system signal value or the protective action;
routing, using an input/output (IO) map of the supervisory system, one of the electric power delivery system signal value or the protective action from the first primary protection relay to a second primary protection relay using the communication switch subsystem;
receiving, from the communication switch subsystem, the one of the electric power delivery system signal value or the protective action from the first primary protection relay at the second primary protection relay; and
implementing, using a protection subsystem of the second primary protection relay, another protective action based on the one of the electric power delivery system signal value or the protective action from the first primary protection relay.

15. The method of claim 14, further comprising selectively transmitting and receiving communications from each of the first primary protection relay and the second primary protection relay.

16. The method of claim 14, wherein the IO map comprises a plurality of associations between the first primary protection relay and the second primary protection relay.

17. The method of claim 14, wherein the IO map comprises a plurality of associations of input communications and a plurality of targets of such input communications, the plurality of targets comprising a plurality of primary protection relays in the electric power delivery system.

18. The method of claim 14, further comprising configuring the IO map to define a communication pathway between the first primary protection relay and the second primary protection relay.

19. The method of claim 14, further comprising:
generating, using the first primary protection relay, a first unique identifier;
generating, using the second primary protection relay, a second unique identifier;
associating, using the communication switch subsystem of the supervisory system, the first unique identifier with the first primary protection relay and the second unique identifier with the second primary protection relay.

20. The method of claim 19, wherein the IO map comprises associations between an input communication, the unique identifier of the first primary protection relay, and the unique identifier of second primary protection relay.

* * * * *